Oct. 26, 1954    R. H. WALTERS    2,692,440
LEVEL
Filed Jan. 29, 1951
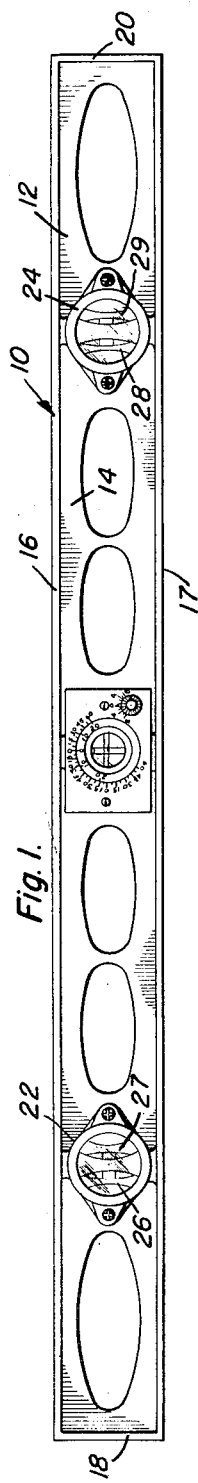
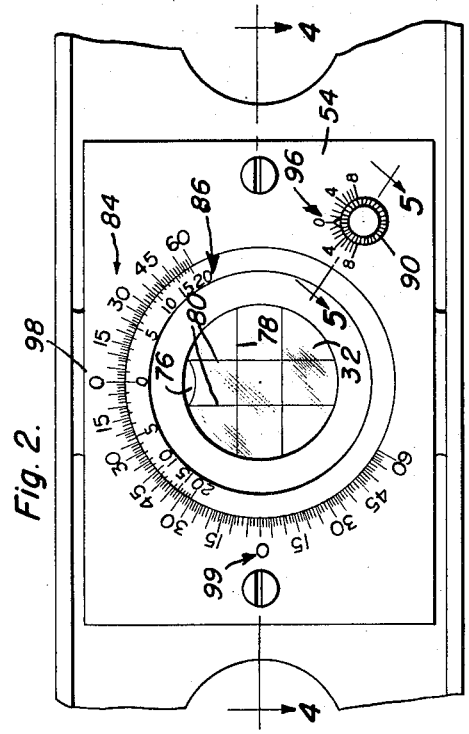
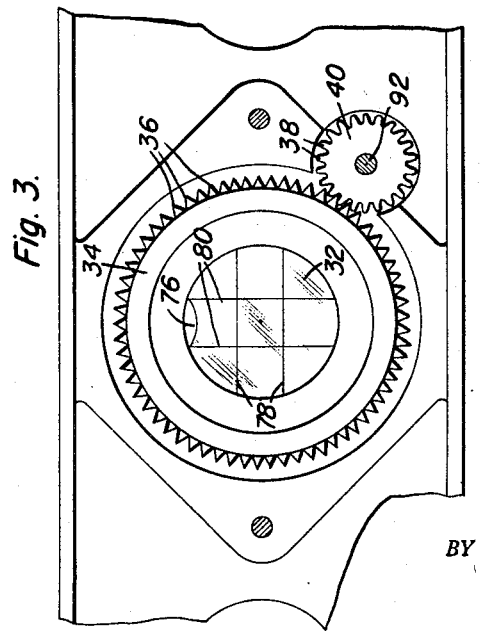
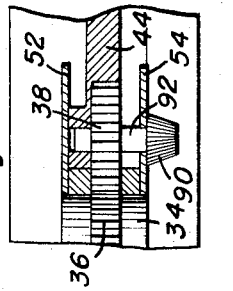
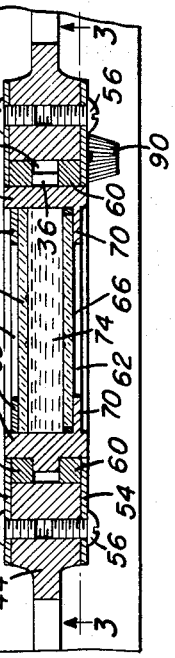
Richard H. Walters
INVENTOR.
BY
Attorneys Patented Oct. 26, 1954

2,692,440

UNITED STATES PATENT OFFICE 2,692,440

LEVEL

Richard H. Walters, Albuquerque, N. Mex., assignor of fifty per cent to Frances J. Clack, Albuquerque, N. Mex.

Application January 29, 1951, Serial No. 208,324

3 Claims. (Cl. 33—214)

This invention relates to levels, and more particularly to a spirit level in which the level member is adjustable relative to the straight edge and provided with a calibrated dial for indicating the rise or fall or degree of variation from the vertical.

It is an object of the invention to provide a spirit level which may be set at various angles so that the level can be used to duplicate the desired angular positioning of structural elements and the laying of drainage tile and the like so that a desired angular deviation can be maintained.

A further object of the invention is to provide a spirit level which is provided with suitable calibrations and dial readings whereby the rise or fall in inches per running foot can be readily ascertained, as well as the deviation in degrees from the vertical may be readily observed from the scale readings on the level.

Another object is to provide a spirit level which can be utilized to eliminate the necessity of using a template in the construction of walls which are to have an angular deviation off-center of gravity.

Still another object is to provide a spirit level which can be utilized to determine the angular deviation, or rise or fall, of an existing structure relative to the horizontal or vertical plumb line or setting which is used as a reference.

The invention also consists in certain new and original features of construction and combination of parts hereinafter set forth and claimed. Various other objects and advantages will be apparent as the invention is described in more detail.

Although the novel features which are believed to be characteristic of this invention will be pointed out more particularly in the claims appended hereto, the invention itself, as to its objects and advantages and manner in which it may be carried out, may be better understood by referring to the following description taken in connection with the accompanying drawings in which a specific embodiment thereof has been set forth for purposes of illustration.

In the drawings:

Figure 1 is an elevational view of a spirit level embodying the novel features of construction in accordance with this invention;

Figure 2 is a face view of the centrally disposed spirit level taken on an enlarged scale and showing the vernier scale therefore and showing the spirit level set at zero reading;

Figure 3 is a similar face view of the spirit level shown in Figure 2 with the vernier dial plate removed and illustrating the gear and pinion structure for rotating the inner dial and hairline markings thereon;

Figure 4 is a section view taken substantially on the line 4—4 of Figure 2 and looking in the direction of the arrows; and Figure 5 is a fragmentary section view taken on the line 5—5 of Figure 2 and looking in the direction of the arrows.

Referring now more in detail to the drawings, wherein like reference characters indicate like parts throughout the several views, the numeral 10 indicates generally a spirit level embodying the novel features of this invention, and which comprises an elongated rectangular frame 12, shown here as formed of lightweight metal casting, skeletonized and provided with reinforcing ribs 14. The level frame 12 comprises flat top and bottom sides 16 and 17, respectively, and which are parallel, with similar parallel ends 18 and 20. The level stock 12 may be formed of wood, or other suitable material, as desired.

Suitably mounted in openings formed in the web section 14 of the level stock 12, as at 22 and 24, are pairs of bubble-vials 26, 27, 28 and 29, respectively, which are conventional in construction. In the middle section of the stock or frame 10 is a circular bubble-vial 32 which is mounted in an annular carrier 34 having teeth 36 arranged around the periphery, which are adapted to mesh with teeth 38 on the pinion gear 40. The carrier 34 in which the bubble vial is mounted is rotatably supported in the thickened web portion 44 of the frame 12 and is snugly fitted thereto between opposed circular plate 52 and 54 which, in turn, are fastened to the web portion 44 by means of the cap screws 56. Bushing rings 60 are suitably positioned between the web portion 44 and carrier 34 and are adapted to engage at opposite sides of the gear teeth 36.

The bubble-vial 32, which is arranged in the opening 62 of the carrier, preferably comprises two spaced parallel glass discs 64 and 66 which are respectively sealed at their periphery to the inner surface of a sealing ring 68 and a flange portion 70 which extend radially inwardly from the carrier 34 at opposite ends of the opening 62. The space between the glass discs is filled with a suitable liquid 74 except for a small bubble 76, which is adapted to be centered between a pair of horizontally disposed lines or marks 78, or vertically disposed crossed pair of lines 80 inscribed on the inside of the glass discs 64 and 66.

To provide for determining the angle of inclination of surfaces upon which the spirit level 10 is placed, with respect to a vertical or horizontal plane, the stationary plate 54 is provided with suitable calibrations or vernier scale graduations 84, as illustrated in Figure 2. Cooperating similar graduations 86 are provided on the rim surface of the rotatable carrier member 34, as at 86, which graduations are calculated to show the rise or fall in inches per running foot. These graduations are calibrated so as to provide a fairly accurate determination of the angular inclinations relative a horizontal plane or a vertical plane. For rotating the carrier 34 and bubble-vial 32 mounted therein, a suitable hand operated button 90 is fitted on the outer end of the axle shaft 92 of the pinion gear 40, the button being positioned on the front of the plate 54, as shown in Figure 2.

Suitable graduations 96 are provided adjacent the dialing button 90, the graduations being designed to indicate the deviation for instance, in one-eighth of an inch from the reference horizontal or vertical plane so that finer readings can be taken. The graduations on scale 84 are suitably calibrated to indicate one inch per foot deviation from the level or horizontal plane for each four degrees on the scale. The "zero" marking, as at 98, when the bubble 76 is in line therewith, as illustrated in Figure 2, represents zero slope, whereas when the bubble is positioned at the "zero" station 99, the slope indicated is perpendicular or vertical and corresponding to a plumb line. Thus, by providing the proper number of teeth 36 on the carrier member 34 and suitably calibrating the vernier scale, the circular spirit level vial 32 can be utilized to determine the degree of slope, relative to a horizontal or vertical plane, by turning the dial 90 so as to bring the markings 80 or 78 in position to line up the bubble 76 therein. Then, by noting the scale readings the degree of deviation can be readily determined. Further, where it is desired to utilize the spirit level to fabricate materials, e. g. rafters of a roof, or to lay pipe at a particular angle to the vertical or horizontal plane, the dial scales 84 and 96 may be set to provide the desired angular deviation and the level used in the normal manner.

The reading illustrated in Figure 2 indicates zero slope, as heretofore explained, and it will be appreciated that rotation of the dial 86 to the right or left of the zero reading 98 will indicate a corresponding right or left hand slope from the horizontal. Where angular deviations from the vertical, or plumb line, are to be measured, the "zero" scale reading 99 will be used as the reference, as will be understood.

Thus, where any desired degree of slope is wished to be maintained during use of the level in a normal manner, it is only necessary to turn the dial 99 to set the spirit level 32 at the proper reading on the vernier scale 84 and 86. Thereafter, during the use of the level, the bubble 76 will be made to align with the lines 89 on the glass discs of the level, whereupon the desired slope will be maintained.

Preferably vernier dial scale reading will be provided for both sides of the level so that readings can be taken from either side of the spirit level during use.

When the level is laid on its side so that the dial faces upwardly the level can be used to take two readings at once. For example, in placing machinery in shops using the level, the position of the bubble when the level is laid on its side indicates not only which end is high or low but also which side is off level. When the bubble is in the center of the circular dial, e. g. between the intersecting lines 78 and 80 (Figure 2), the machine is level in all directions. This use of the level laid on its side permits a high degree of accuracy. With the bubble located in the center of the dial, a variation of as little as 0.003 of an inch on one end of the level will throw the bubble out of its center position and into one of the surrounding areas.

Where desired, the level of the invention may be attached as standard equipment for power tools, guns, drilling machines and the like equipment which require dead leveling before use. The level may also, if desired, be clamped in one position on a support or piece of equipment and retained there throughout its use.

From the foregoing description and drawings, it is believed that the construction and operation of the improved spirit level will be readily understood and that further description is unnecessary.

While certain novel features of the invention have been disclosed and are pointed out in the annexed claims, it will be understood that various omissions, substitutions and changes may be made by those skilled in the art without departing from the spirit and scope of this invention.

Having described the invention, what is claimed as new is:

1. A spirit level comprising a rectangular frame having a plurality of bubble vials therein, one of said bubble vials being rotatable and including opposed flat circular faces, an annular carrier mounting said faces in spaced opposing relation and teeth disposed on the periphery of said carrier, sets of parallel guide lines on said faces arranged in the form of a Maltese cross and terminating adjacent the rim of said carrier, the bubble in said vial being adapted to be positioned within a selected set of guide lines at the rim of the carrier, means on said frame for rotating said rotatable bubble vial and means comprising vernier scale graduations cooperating with said rotatable vial for indicating the deviation from the vertical and horizontal of a surface upon which the level is placed.

2. The combination of claim 1 wherein said rotating means includes a pinion mounted on said frame operatively engaging said teeth for setting said rotatable vial to provide a particular slope per fraction of distance.

3. The combination of claim 2 wherein said graduations are calibrated to indicate degrees and inches per foot deviation from the vertical and horizontal.

References Cited in the file of this patent

UNITED STATES PATENTS

| Number | Name | Date |
|---|---|---|
| 199,319 | Schnell | Jan. 15, 1878 |
| 516,898 | Olson | Mar. 20, 1894 |
| 592,537 | Carriere | Oct. 26, 1897 |
| 612,577 | Smith | Oct. 18, 1898 |
| 785,581 | Shorts | Mar. 21, 1905 |
| 800,739 | Grosser | Oct. 3, 1905 |
| 809,275 | Brown et al. | Jan. 2, 1906 |
| 866,541 | Wagner | Sept. 17, 1907 |
| 935,807 | Oswald | Oct. 5, 1909 |
| 1,012,668 | Lofberg | Dec. 26, 1911 |
| 1,215,035 | Kocisko | Feb. 6, 1917 |
| 1,254,574 | Butler et al. | Jan. 22, 1918 |
| 1,630,174 | Elsas | May 24, 1927 |
| 2,129,695 | Karnes | Sept. 13, 1938 |
| 2,206,817 | Mann | July 2, 1940 |
| 2,305,678 | Cravaritis et al. | Dec. 22, 1942 |
| 2,423,317 | Holton | July 1, 1947 |
| 2,453,091 | Holloway et al. | Nov. 2, 1948 |
| 2,487,245 | Hubbard | Nov. 8, 1949 |
| 2,562,127 | Sand | July 24, 1951 |
| 2,568,143 | Casper | Sept. 18, 1951 |